Oct. 11, 1938.　　　　J. G. JACKSON　　　　2,132,630
MOUNTING MEANS FOR ENCLOSED ELECTRIC DEVICES
Filed April 7, 1937　　　2 Sheets-Sheet 1

INVENTOR
John G. Jackson.
BY Myron J. Seibold
ATTORNEY

Oct. 11, 1938.   J. G. JACKSON   2,132,630
MOUNTING MEANS FOR ENCLOSED ELECTRIC DEVICES
Filed April 7, 1937   2 Sheets-Sheet 2

INVENTOR
John G. Jackson.
BY Myron J. Seibold
ATTORNEY

Patented Oct. 11, 1938

2,132,630

UNITED STATES PATENT OFFICE 2,132,630

MOUNTING MEANS FOR ENCLOSED ELECTRIC DEVICES

John G. Jackson, Detroit, Mich., assignor to Square D Company, Detroit, Mich., a corporation of Michigan Application April 7, 1937, Serial No. 135,387

7 Claims. (Cl. 247—10)

This invention relates to means for mounting electric circuit instrumentalities within a box and has for its object the provision of a mounting pan which shall be adapted for use with both flush and surface mounting of the enclosure.

Another object of the invention is to provide an improved adjustable mounting for an electric instrumentality within an enclosing box.

Another object of the invention is the provision of a hingedly mounted pan for swingably supporting an electric circuit controlling instrumentality within an enclosing box which pan shall be adjustable forwardly of the box to adjust the position of the instrumentality within the box for surface mounting.

Another object of the invention is to provide a hingedly mounted pan for swingably supporting an electric circuit breaker within an enclosing box in which the hinge mounting for the pan is adjustable relative to the box to adjustably support the circuit breaker within the box to accommodate varying positions of the cover relative to the box.

Other objects and features of the invention will be readily apparent to those skilled in the art from the following specification and appended drawings illustrating certain preferred embodiments of the invention in which.

Figure 1:
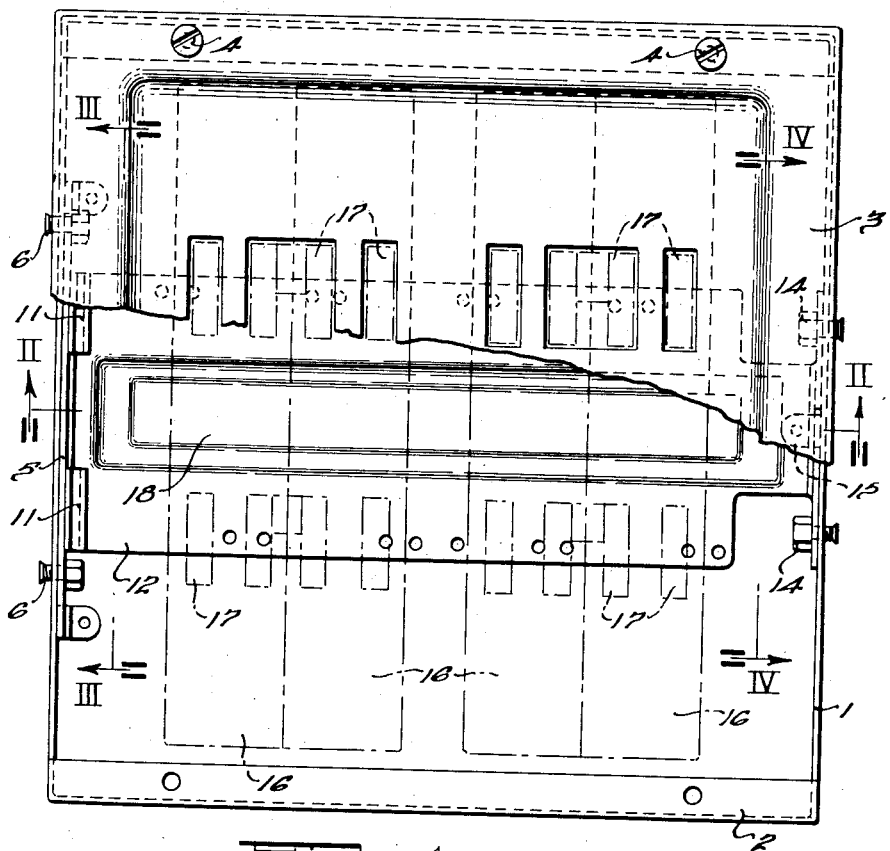
Figure 1 is a front elevational view of the mounting means according to the present invention applied to a surface mounted enclosure with a portion of the cover broken away to show internal parts.
Figure 2:
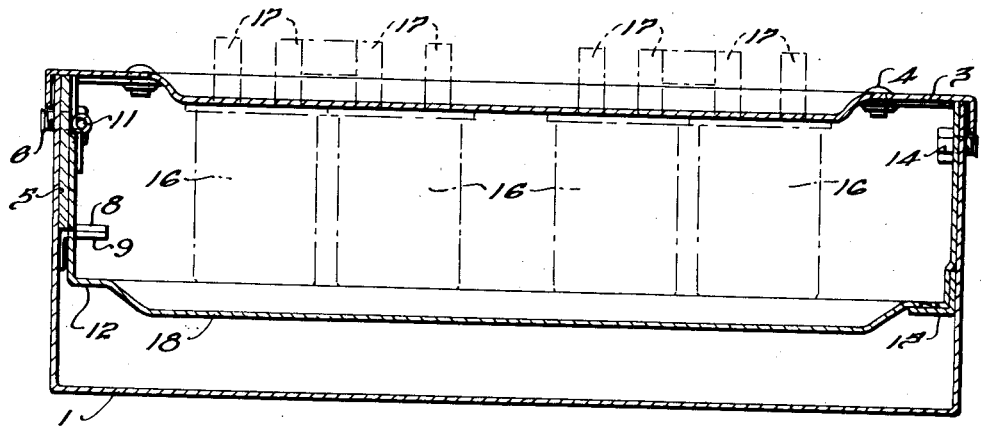
Figure 2 is a horizontal sectional view on the line II—II of Figure 1.
Figure 3:
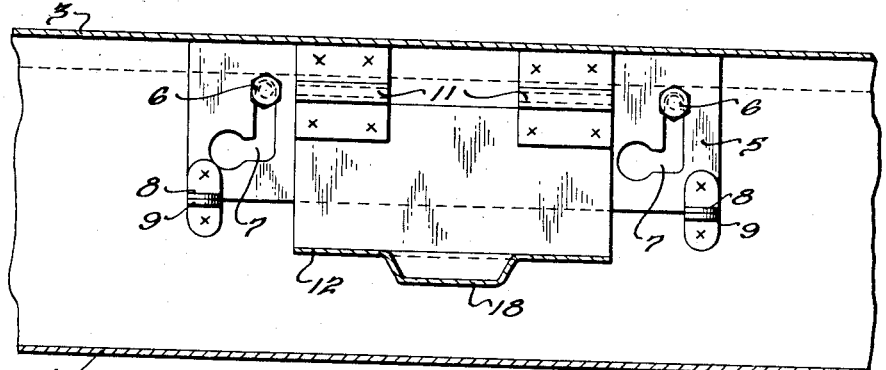
Figure 3 is a partial vertical sectional view on the line III—III of Figure 1.
Figure 4:
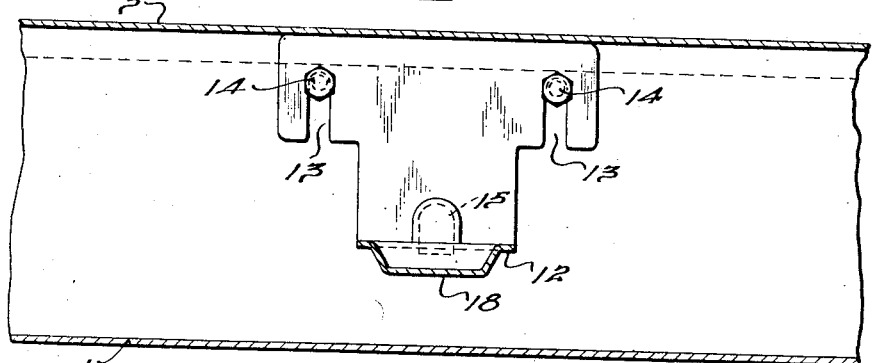
Figure 4 is a partial sectional view on the line IV—IV of Figure 1.
Figure 5:
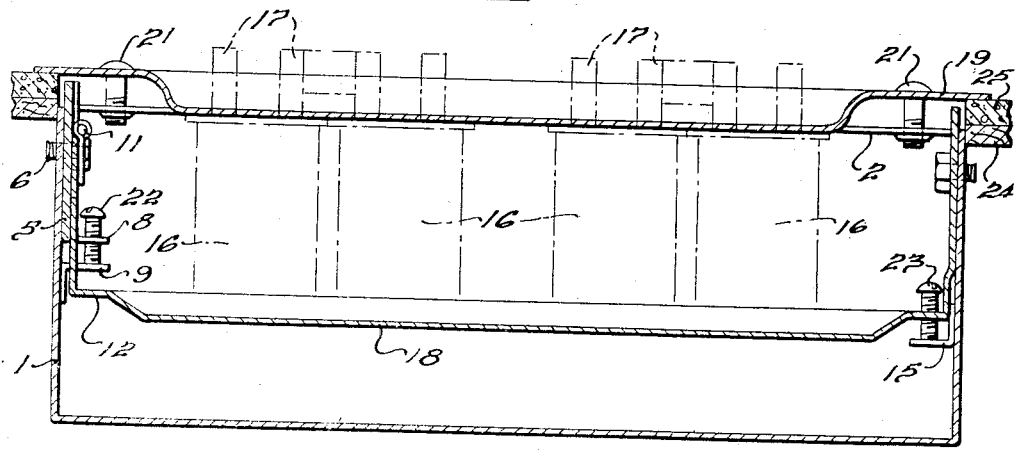
Figure 5 is a view similar to Figure 2 but showing the mounting means as applied to a flush mounted enclosure.

The surface mounted arrangement illustrated in Figures 1 to 4 inclusive includes an enclosing box 1 having top and bottom flanges 2 and a front cover 3 with removable studs 4 threaded into the flanges 2 to hold the covers 3 on the box. Upon the left hand side wall, as shown in Figure 1, is mounted a supporting plate 5, more particularly shown in Figure 3, as by means of studs 6 and L-shaped slots 7 having enlarged portions, as shown, permitting removal of the plate 5 without detachment of the studs 6. Interengaging pairs of brackets 8 and 9 are mounted upon the plate 5 and the side wall of the box respectively and are in contact in the interior position of the plate. Upon the plate 5 are rigidly mounted one of the sides of hinges 11 and to the other side of the hinges is rigidly secured a generally U-shaped supporting pan 12 having one of its legs engaging the plate 5 and its opposite leg engageable with the opposite side wall of the box where it is formed, as shown in Figure 5, with slots 13 engageable with studs 14 on the interior side wall of the box to limit the position of the pan within the box and to securely hold it therein. A bracket 15 is mounted on the side wall of the box which carries the studs 14 and is adapted to cooperate with the adjacent corner of the pan 12. Upon the bottom portion of the pan 12 are rigidly mounted electric circuit instrumentalities 16 which may be enclosed electric circuit breakers of the type illustrated in copending applications of John G. Jackson, Serial No. 36,247 filed August 15, 1935; Serial No. 72,035 filed April 1, 1936; Serial No. 77,519 filed May 2, 1936; all entitled Circuit breakers, and in the divisions and continuations of these applications. These circuit breakers have exterior handle portions indicated generally at 17 accessible in front of the cover 3 which is provided with openings adapted to receive and embrace the handles to permit ready removal of the cover without disturbing the handles. The central portion of the bottom of the pan 12 is provided with a depressed portion 18 which serves to strengthen the pan and also to provide clearance for a connecter, if desired, beneath the units 16.

In the surface type mounting arrangement shown in Figures 1 to 4 inclusive the plate 5 is mounted by insertion of the enlarged portions of the slots 7 over the heads of the studs 6 and it is thereafter moved downwardly and backwardly to accommodate the studs within the elongated legs of the slots. In the surface mounted enclosure the plate 5 is simply moved backwardly until the flanges 8 and 9 engage, in which position the studs 6 are approximately at the ends of the slots 7, and the studs tightened to rigidly support the plate on the box. The studs 14 on the opposite side wall of the box receive the slots 13 and tightening of the studs securely holds the mounting pan in the box. Loosening of the studs 14 after removal of the box cover permits the mounting pan and the instrumentality supported thereon to be swung outwardly on the hinges 11 to expose the box interior for manipulation such as the drawing in of circuit wires and the attachment of conduit.

The flush mounted enclosure illustrated in Figure 5 uses the identical parts previously described but with the cover changed to the flush type cover 19, the use of the elongated cover securing studs 21, the addition of a pair of studs 22 threaded in the brackets 8 and bearing against the brackets 9 and the addition of a stud 23 threaded into the bottom of the pan 12 above the bracket 15 and bearing against this bracket. The other parts of the mounting remain the same as those previously described. In the flush type arrangement illustrated in Figure 5 the enclosing box 1 is embedded in the wall before the final wall surface is applied and the wall is here shown as being formed of the lathing 24 and exterior plaster surface 25. In the flush mounting arrangement it is necessary to provide adjustment for the mounting of the instrumentality within the box so that the front of the instrumentality will engage the draw on the cover 19 regardless of the thickness of the final wall. With the arrangement herein described this adjustment is secured by the turning of the studs 22 and 23. To make this adjustment the studs 6 and 14 are loosened whereupon turning of the studs 22 and 23 permits the plate 5 and the pan 12 to move forwardly or backwardly relative to the enclosing box to properly position the instrumentality with respect to the cover. When the desired position has been attained the studs 6 and 14 may again be tightened to securely hold the pan and instrumentality in the desired position. If access to the interior of the box is desired the studs 14 may be loosened and the mounting pan and the instrumentalities supported thereon swung outwardly to uncover the box interior in the same manner as when the adjustable mounting was not used. This arrangement permits the use of a common pan for both flush and surface mounted enclosures which will correctly position the supported instrumentalities with respect to the cover in the case of the flush mounting with only the addition of simple parts to the standardized fittings used for both the mounting arrangements, while providing for the swingable mounting of the instrumentalities to readily uncover the box interior.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What is claimed is:

1. Supporting and enclosing means for an electric circuit controlling instrumentality comprising an enclosing box, a supporting pan mounted within said box, cooperating portions on the pan and the opposite side walls of the box adapted to engage in the extreme interior position of the box, adjustable means for causing relative movement between said cooperating portions to vary the position of the pan relative to the box to accommodate variations in the cover spacing, and means for rigidly securing said pan to the opposite side walls of the box to positively hold it in its adjusted position.

2. Supporting and enclosing means for an electric circuit controlling instrumentality comprising an enclosing box, a supporting pan mounted within said box, cooperating portions on the pan and the opposite side walls of the box, adjustable means for causing relative movement between said cooperating portions to vary the position of the pan relative to the box to accommodate variations in the cover spacing, means for rigidly securing said pan to the opposite side walls of the box to positively hold it in its adjusted position, and means hingedly mounting said pan whereby on release of said securing means at one side wall the pan and the instrumentality supported thereon may be swung to the exterior of the enclosing box.

3. Supporting and enclosing means for an electric circuit controlling instrumentality adapted for both flush and surface mounting comprising an enclosing box adapted to cooperate with both flush and surface type covers as desired, a supporting plate adjustably mounted on a side wall of the box, a supporting pan hingedly mounted on said plate and having a portion engaging a part on the opposite side of the box to releasably secure the pan within the box, and at least one electric circuit controlling instrumentality supported on the pan within the box.

4. Supporting and enclosing means for an electric circuit controlling instrumentality adapted for both flush and surface mounting comprising an enclosing box adapted to cooperate with both flush and surface type covers as desired, a supporting plate adjustably mounted on a side wall of the box, a supporting pan hingedly mounted on said plate and having a portion engaging a part on the opposite side of the box to releasably secure the pan within the box, at least one electric circuit controlling instrumentality supported on the pan, cooperating portions on said plate and the side wall upon which is supported, and adjustable means for causing relative movement between said portions to vary the position of the plate and the supporting pan within the box to accommodate variations in the spacing of the flush type cover.

5. Supporting and enclosing means for an electric circuit controlling instrumentality adapted for both flush and surface mounting comprising an enclosing box adapted to cooperate with both flush and surface type covers as desired, a supporting plate adjustably mounted on a side wall of the box, a supporting pan hingedly mounted on said plate and having a portion engaging a part on the opposite side of the box to releasably secure the pan within the box, at least one electric circuit controlling instrumentality supported on the pan, portions on said plate and the side wall upon which is supported interengaging in the extreme backward position of the plate, adjustable means for separating said portions to vary the position of the plate and the supporting pan within the box to accommodate variations in the spacing of the flush type cover, and means for rigidly holding said plate on the side wall in its adjusting position.

6. Supporting and enclosing means for an electric circuit controlling instrumentality adapted for both flush and surface mounting comprising an enclosing box adapted to cooperate with both flush and surface type covers as desired, a supporting plate adjustably mounted on a side wall of the box, a supporting pan hingedly mounted on said plate and having a portion engaging a part on the opposite side of the box to releasably secure the pan within the box, at least one electric circuit controlling instrumentality supported on the pan, cooperating portions on said plate and on the side wall on which it is mounted and cooperating portions on the pan and on the opposite side wall, and adjustable means for causing relative movement between said cooperating portions to vary the position of the pan within the box to accommodate varying spacings of a flush type cover.

7. Supporting and enclosing means for an electric circuit controlling instrumentality adapted for both flush and surface mounting comprising an enclosing box adapted to cooperate with both flush and surface type covers as desired, a supporting plate adjustably mounted on a side wall of the box, a supporting pan hingedly mounted on said plate and having a portion engaging a part on the opposite side wall of the box to releasably secure the pan within the box, at least one electric circuit controlling instrumentality supported on the pan, portions on said plate and on the side wall on which it is mounted and on the pan and on the opposite side wall interengaging in the extreme inward position of the pan, adjustable means for separating said interengaging portions a desired distance to vary the position of the pan within the box to accommodate varying spacings of a flush type cover, means for rigidly securing the plate to the box side wall in its adjusted position, and means for rigidly securing the pan to the opposite side wall in its adjusted position, said last mentioned means being releasable to permit swinging movement of the pan and the instrumentality supported thereon to the exterior of the box.

JOHN G. JACKSON.